United States Patent Office 2,873,124
Patented Feb. 10, 1959

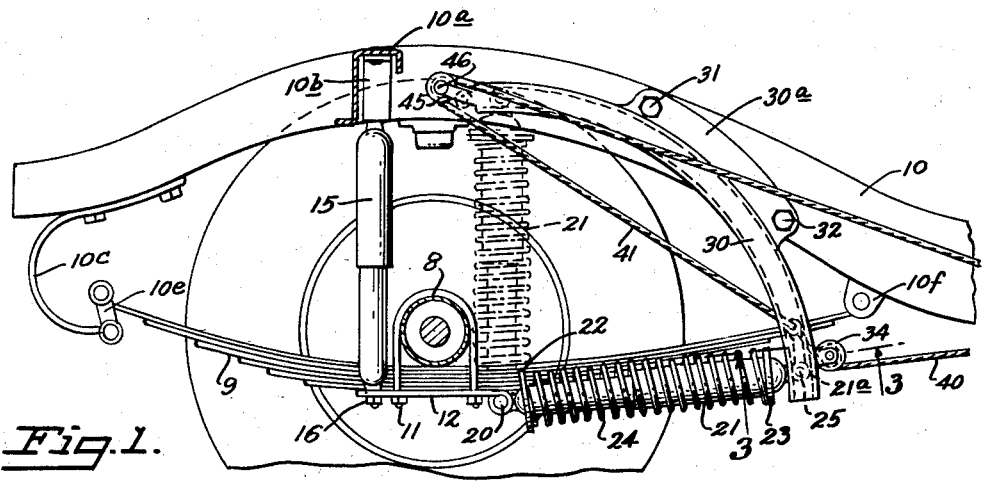

2,873,124
AUXILIARY VEHICLE SUSPENSION
Brooks Walker, Piedmont, Calif.
Application February 26, 1954, Serial No. 412,864
6 Claims. (Cl. 280—124)

This invention pertains to improvements in vehicle suspension, and particularly to improvements to overload type springs which can be engaged or disengaged or made effective or ineffective from the driver's compartment more or less along the lines of the general principles embodied in my issued U. S. Patent No. 2,518,733. However, this invention represents improvements in the construction, as shown in said issued patent, wherein the auxiliary spring is moved from a horizontal position wherein one end is attached to the supporting structure for one of the vehicle wheels and the other end is carried on the spring portion of the body in the inactive position. Then, as more overload spring is desired, the end of the overload spring and possibly shock absorber as an assembly are moved upwardly on a quadrant or cam to the full overload position in which the assembly is substantially vertical between the vehicle wheel supporting structure and the vehicle frame or body. Differing degrees of suspension can be obtained by holding the overload spring in any position between the horizontal inactive position and the vertical fully active position. Because of design limitations, etc. it may not be desirable to have the shock absorber spring in the exactly vertical position, and it may be left in the position somewhat off from the vertical—either slanted towards the center of the vehicle or away from the center of the vehicle or forward or backward from the vertical. Cables or other suitable means can be used from a control within the vehicle to actuate the overload springs from their inactive more or less horizontal position to their active vertical positon or to any intermediate stops. The guide for the upper end of the overload spring in moving from inactive to the active position may move on a track, on a rod of curved contour, or it may be operated on a crank from a pivot position somewhere near the neutral height of the support of the overload spring to the wheel supporting structure when the vehicle is either unloaded or with a normally light load. By this means I have provided an overload spring and a shock absorber which can be moved from an inactive position, wherein the overload spring moves a very minimum amount in a normal action of the rear axle to a position where the overload spring is in the maximum effective position without the problem of disconnecting and connecting the overload spring and with the resultant quietness of operation and infinite variety of auxiliary overload suspension assist.

Another feature of the invention is the very low extra weight that needs to be added to the vehicle, the ease of mounting it on existing vehicles or on newly manufactured vehicles, the low cost of the parts, and the low weight of the parts, and the very low unsprung weight that is added to the vehicle.

Another feature is to provide an overload spring which has additional shock absorber characteristics so that added shock resistance is provided when the springs are in the effective position and when they are not which will provide improved riding characteristics over an overload spring that changes the rate of the rear spring without changing the shock absorber characteristics.

Other features of the invention will be more particularly pointed out in the accompanying specifications and claims.

I have illustrated my invention by way of example in the accompanying drawings, in which:

Fig. 1 is a cut away view, partly in section, showing one form of the invention applied to a portion of a vehicle.

Fig. 2 is a cut away view, partly in section, of a portion of a vehicle, like Fig. 1, taken inside of one of the rear vehicle wheels and showing another form of the invention.

Figure 3 is a cut away view of a portion of the structure shown in Fig. 1, taken at section 3—3.

Fig. 4 is a cut away view, taken at section 4—4 of Fig. 2.

Fig. 5 is a reduced scale plan view of the rear portion of a vehicle, showing the control mechanism as applied to the form of the invention shown in Fig. 1.

Fig. 6 is a cut away view taken inside of one of the rear wheels of a vehicle, showing a portion of the frame and wheel supporting structure, embodying another form of the invention.

In all figures like numerals of reference refer to corresponding parts.

In Figs. 1 and 5 I have shown a car frame 10, a wheel supporting structure or axle 8, secured to a resilient rear spring 9 by U-bolts 11 and spring plate 12. Spring hanger 10f supports the front end of the spring and pivots it to the frame 10 while the rear end of the spring is supported by shackle 10e and spring hanger 10c. Shock absorber 15 is attached between spring plate 12 and the cross member of the frame 10a and shock absorber mounting bracket 10b. Auxiliary spring suspension is provided through spring and shock absorber 21 pivoted at its axle end to bolt 20 and carrying a lower washer 22 and an upper washer 23 between which is the auxiliary coil spring 24. The other end of the spring shock absorber assembly carries an extension 25 and two rollers 26 which travel with very close clearances at the top and bottom inside of special curved channel 30. Curved channel 30 has flange 30a and is bolted to vehicle frame 10 by bolts 31 and 32 to form a rigid secure guide for the upper end of the spring shock absorber assembly 21. Extension 21a at the track end of the shock absorber spring assembly 21 is attached to cable 41 and cable 40. Cable 40 travels around pulley 34 and goes forward to a reel which is shown in Fig. 5 as cable receiving reel 64. A crank 62 may extend through the floor boards of a vehicle so that the operator can turn the crank to raise or lower the forward end of the spring shock absorber assembly from the almost horizontal position shown in Fig. 1 to the dotted line position also shown in Fig. 1. Cable 41 goes around pulley 45 which is bearinged on bolt 46 and goes to the opposite side of pulley 64 so that as cable 41 is wound onto drum 64 cable 40 is wound off the drum and the spring shock absorber assembly 21 is raised from the horizontal position to any intermediate position up to the vertical, as shown in dotted lines in Fig. 1. The normal shock absorber 15 is left connected all of the time between cross member 10a, shock absorber adapter 10b at its upper end, and the spring plate 12 at its lower end where it is connected by bolt 16. By this construction it is seen that I have provided a construction wherein a spring assembly with or without a shock absorber may be manually moved, from a control within the interior of a car from a horizontal position where practically no support is provided by the auxiliary spring and one end of the spring mechanism moves up and down vertically with the axle or wheel supporting structure while the other end stays with the sprung portion of the vehicle, to a position up towards the vertical where more and more supporting effort is exerted between the vehicle wheels and the body to effect more overload support, and if the shock absorber is included more shock absorber resistance. The spring shock absorber assembly is always connected between the vehicle frame and the wheel supporting structure so that no connection needs to be made or disconnected during the change from no overload to full overload. Also, any degree of overload may be obtained by stopping the structure at any intermediate position. A lock 60 and manually operated handle 63 locks the controlling drum 64 in any desired position.

In Fig. 2 I have shown a construction in which the guided upper end of the spring shock absorber combination moves on a curved rod 50 which is supported by bolt 51 to the frame at its upper end and to bracket 52 at its lower end. Bracket 52 is secured to the frame by bolts 53.

As shown in Figs. 2 and 4, rollers 28 and 29 may be attached to extension 21a of the shock absorber spring combination 21 and these rollers are concave to fit the contour of rod 50 so as to keep the movable end of the spring shock absorber combination in close contact with the rod 50 as it is moved from its horizontal position, as shown in Fig. 2, to any other position between that and the vertical. Cables 40 and 41, and 41a and 40a on the opposite side of the vehicle, as shown in Fig. 5, may be used to actuate the mechanism shown in Figs. 2 and 4, or any other suitable power or manual means of moving the auxiliary spring and shock absorber may be used. The other parts of the figure are similar to those shown in Fig. 1.

In Fig. 6 I have shown a different construction in which the plate or bracket 6 is bolted to the frame by bolts 5 and carries a crank shaft 70 with a crank end 72 extending into a bearing 6a in plate 6 at its lower end, as viewed in Fig. 6, and a crank end 71 at the upper end is attached to the upper end of the spring shock absorber combination 21. The lower end of the spring shock absorber combination 21 is attached to bolt 20 on the spring plate 11 in a manner similar to that shown in Figs. 1 and 2. Cables 40 and 41 travel around pulleys pivoted to bolt 5 and also around pulley 77 so that the same kind of mechanism, as shown in Fig. 5, can be used for raising and lowering the spring shock absorber combination from an inactive horizontal position to the substantially vertical fully active overload position. A hydraulic cylinder could be anchored at one end to the frame 10 and at the other to the crankshaft 70 above bearing 6a to operate the crankshaft 70 to vary the degree of overload support. The construction shown in Fig. 6 is quite simple, inexpensive, and could probably allow the use of some rubber bearings or bearings requiring little or no lubrication.

Other features of the invention will be more particularly pointed out in the accompanying claims.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim as my invention:

1. In a vehicle having at least one of its wheel axles connected to its frame by resilient suspension means, the combination therewith of: overload auxiliary resilient means associated with each said resilient suspension means and having at one end a pivotal connection operatively connected to said axle and at the other end a bearing connection over an arcuate path operatively connected to said frame, the radial center of said arcuate path being fixed relatively to said frame and on the same side of said path as said pivotal connection, the rotational position of said auxiliary resilient means varying over said arcuate path from a substantially inoperative position through an infinitude of positions of varying degrees of effectiveness to a fully effective position, whereby any degree of overload effectiveness can be obtained vetween zero and the full potential of said auxiliary resilient means; an arcuate rigid member rigidly secured to said frame against which the non-pivoted end of said auxiliary resilient means bears at all its rotational positions, said arcuate rigid member comprising a channel member having three fully closed sides and inturned flanges partially closing the fourth side; and roller means on the outer end of said auxiliary resilient means engaging said arcuate rigid member for low-friction contact, said roller means engaging the interior of said flanges and the opposite wall of said channel.

2. In a vehicle having at least one of its wheel axles connected to its frame by resilient suspension means, the combination therewith of: an arcuate rigid member rigidly secured to said frame and comprising a channel member having three fully closed sides and inturned flanges partially closing the fourth side; overload auxiliary resilient means associated with each said resilient suspension means and having at one end a pivotal connection operatively connected to said axle and at the other end roller means engaging said arcuate rigid member for low-friction contact and bearing against it at all its rotational positions over an arcuate path operatively connected to said frame, said roller means engaging the interior of said flanges and the opposite wall of said channel, the radial center of said arcuate path being fixed relatively to said frame and on the same side of said path as said pivotal connection, the rotational position of said auxiliary resilient means varying over said arcuate path from a substantially inoperative position through an infinitude of positions of varying degrees of effectiveness to a fully effective position, whereby any degree of overload effectiveness can be obtained between zero and the full potential of said auxiliary resilient means.

3. In a vehicle having at least a wheel supporting structure connected to its frame by resilient suspension means, the combination therewith of auxiliary resilient overload means pivotally connected at one end to the wheel supporting structure to permit movement of the other end in an arcuate path, the radial center of the path being fixed relative to the frame and on the same side of the path as said pivotal connection, the resilient overload means being movable between substantially horizontal and vertical positions, remote control means connected to said overload means for moving and holding said overload means in any adjusted position and further means mounted on the frame and inseparably connected to the said other end of the overload means to secure said other end against independent radial movement relative to the frame and to confine the said other end to movement in the arcuate path fixed relative to the frame, said overload means thus supporting said frame and aiding in the support of the wheel supporting structure when depending from the frame.

4. The combination of claim 3 in which the further means comprises an arcuate member rigidly secured to the frame and having a radial center coinciding with the fixed radial center of the path, the other end of the overload means being provided with roller means with which the arcuate member is inseparably connected.

5. The combination of claim 3 in which the further means comprises an arcuate rod rigidly secured to the frame and having a radial center coinciding with the fixed radial center of the path, the other end of the overload means being provided with a pair of radially spaced rollers, one on each side of the rod.

6. The combination of claim 3 in which the further means comprises a crank member having one end pivotally mounted on the frame at the said fixed radial center of the arcuate path, the other end of the crank member being attached to said other end of the resilient overload means.

References Cited in the file of this patent

UNITED STATES PATENTS

| | | |
|---|---|---|
| 1,229,254 | Goodwin | June 12, 1917 |
| 2,209,632 | Martin | July 30, 1940 |
| 2,518,733 | Walker | Aug. 15, 1950 |
| 2,539,251 | Huff | Jan. 23, 1951 |

FOREIGN PATENTS

| | | |
|---|---|---|
| 363,045 | Italy | Sept. 16, 1938 |